(12) United States Patent
Sathananthan et al.

(10) Patent No.: US 8,406,355 B2
(45) Date of Patent: Mar. 26, 2013

(54) METHOD AND APPARATUS FOR CHANNEL ESTIMATION IN OFDM

(75) Inventors: Satha Sathananthan, Victoria (AU); Kevin Lin, Victoria (AU); Thanh Bui, Victoria (AU); Dobrica Vasic, Victoria (AU)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 12/733,185

(22) PCT Filed: Aug. 14, 2008

(86) PCT No.: PCT/JP2008/065055
§ 371 (c)(1),
(2), (4) Date: Apr. 29, 2010

(87) PCT Pub. No.: WO2009/025376
PCT Pub. Date: Feb. 26, 2009

(65) Prior Publication Data
US 2010/0290570 A1 Nov. 18, 2010

(30) Foreign Application Priority Data

Aug. 17, 2007 (AU) .................................. 2007904421

(51) Int. Cl.
*H04L 27/00* (2006.01)

(52) U.S. Cl. ....................................................... 375/346
(58) Field of Classification Search .................. 375/260, 375/316, 340, 342, 346–350
See application file for complete search history.

(56) References Cited

U.S. PATENT DOCUMENTS

| 5,307,376 | A | 4/1994 | Castelain et al. |
| 7,016,298 | B2 | 3/2006 | Akiyama et al. |
| 7,583,739 | B2 | 9/2009 | Higuchi et al. |
| 8,023,526 | B2 * | 9/2011 | Kim ............................. 370/437 |
| 2001/0055295 | A1 | 12/2001 | Akiyama et al. |
| 2005/0105647 | A1 | 5/2005 | Wilhelmsson et al. |
| 2006/0098766 | A1 * | 5/2006 | Pietraski et al. ............. 375/346 |
| 2006/0209932 | A1 * | 9/2006 | Khandekar et al. .......... 375/148 |
| 2006/0221808 | A1 | 10/2006 | Shirakata et al. |
| 2009/0252263 | A1 * | 10/2009 | Liu et al. ...................... 375/344 |

FOREIGN PATENT DOCUMENTS

| JP | 5-75568 A | 3/1993 |
| JP | 2002-9728 A | 1/2002 |
| JP | 2002-43995 | 2/2002 |
| JP | 2004-241804 A | 8/2004 |
| JP | 2004-266814 A | 9/2004 |

(Continued)

OTHER PUBLICATIONS

C.R.N. Athaudage, et al., "Low-complexity Channel Estimation for Wireless OFDM Systems," Personal, Indoor and Mobile Radio Communications, 2003. PIMRC 2003. 14th IEEE Proceedings on, vol. 1 Sep. 2003, pp. 521-525.

(Continued)

*Primary Examiner* — Khanh C Tran
(74) *Attorney, Agent, or Firm* — McGinn IP Law Group, PLLC

(57) ABSTRACT

The present invention relates to methods that can be used in a wireless communication system, and systems adapted to use such methods. In a preferred form the methods are useful in channel estimation in a wireless communication system using orthogonal frequency division multiplexing (OFDM). The system is provided with a control block to optimize channel estimation.

11 Claims, 5 Drawing Sheets

FOREIGN PATENT DOCUMENTS

| | | |
|---|---|---|
| JP | 2004-282613 A | 10/2004 |
| JP | 2005-286636 A | 10/2005 |
| JP | 2005-328312 | 11/2005 |
| JP | 2006-314088 A | 11/2006 |
| JP | 2007-104574 A | 4/2007 |
| JP | 2007-511942 | 5/2007 |
| JP | 2008-199612 A | 8/2008 |
| WO | WO 2005/048546 A2 | 5/2005 |
| WO | WO 2007/077608 A1 | 7/2007 |
| WO | WO 2008/023680 A1 | 2/2008 |

OTHER PUBLICATIONS

Japanese Office Action dated Jul. 31, 2012, with English translation.
"Adaptive Prediction Iterative Channel Estimation for OFDM Signal Reception in a Frequency Selective Fading Channel", Takaoka, et al., Technical Report of IEICE, RCS2002-157 (Aug. 2002).

* cited by examiner

METHOD AND APPARATUS FOR CHANNEL ESTIMATION IN OFDM

FIELD OF THE INVENTION

The present invention relates to methods that can be used in a wireless communication system, and systems adapted to use such methods. In a preferred form the methods are useful in channel estimation in a wireless communication system using orthogonal frequency division multiplexing (OFDM).

BACKGROUND OF THE INVENTION

It will be convenient to describe the preferred embodiments of the invention using terminology consistent with that used by the 3rd Generation Partnership Project (3GPP). However, the present invention should not be considered as being limited to use in networks complying with 3GPP Standards.

The applicant does not concede that the prior art discussed herein forms part of the common general knowledge in the art at the priority date of the present application.

Throughout the present specification the following abbreviations and acronyms will be used.

| | |
|---|---|
| RS | Reference Signal |
| CE | Channel Estimation |
| RE | Resource Element |
| CIR | Channel Impulse Response |
| VCIR | Virtual CIR |
| CFR | Channel Frequency Response |
| VCFR | Virtual CFR |
| TF | Time Frequency |
| CP | Cyclic Prefix |
| ABS | Absolute Value |
| FH | Frequency Hopping of RS |
| UE | User Equipment |
| LTE | Long Term Evolution of 3GPP networks |

In OFDM system, pilot symbol or RS are inserted into the time frequency (TF) grid in a transmitted signal so that UE can estimate the channel for all RE carrying data. To keep the overhead relating to RS small, RS RE are spaced in time and frequency as shown in FIG. 1 below.

In FIG. 1:
There are 7 OFDM symbols in one slot in time direction
There are 17 sub-carriers in frequency direction
1st and 5th OFDM symbols in a slot carry RS
Diagonally hatched and cross hatched RE contains RS
RS spacing in the frequency domain is 6.

There exist various way of completing the CE for the rest of the RE. In a typical method, the following steps can be followed:

UE first obtains CE for every sub-carrier in the OFDM symbol where RS is transmitted, e.g. the 1st and 5th OFMD symbol in a slot in this example; (see block M1 to M6 below).

Then UE uses time interpolation to obtain CE for every OFDM symbol in a slot where RS is not transmitted, e.g. 2nd, 3rd, 4th, 6th, 7th OFDM symbol in a slot in this example (see block M7 below).

The basic system for performing CE in a UE is illustrated in FIG. 2. Its operation will now be briefly described:

In this discussion let Nrs denote the number of RS RE in one OFDM symbol

Block M1—uses Nrs RS REs to generate a vector of tentative estimates, the Length of the vector Nls=Nrs.

Block M2—generates vector of VCFR of size N which is the smallest power of 2 that is larger Nls, using the vector from block M1 as an input. The simplest way is to add (N-Nls) zeros to the end of the input vector.

Block M3—performs an N point IFFT

Block M4—performs de-noising of the time domain signal i.e. zeroing all samples which have magnitude smaller than a preset de-noise threshold.

Block M5—performs an N points FFT

Block M6—performs frequency interpolation between RS RE to obtain CE for all sub-carriers (6Nrs) in the OFDM symbol.

Block M7—performs time interpolation to obtain CE for all OFDM symbol in a slot not carrying RS However using such a system it may not be possible to obtain accurate CE in different channel conditions, mainly defined by Doppler, Delay spread, and Noise level.

SUMMARY OF THE INVENTION

In a first aspect the present invention provides a method of controlling an interpolation process in a device of a wireless communications system configured to receive a signal including a plurality of signal positions able to be defined by a time position and sub-carrier frequency, the method including:

comparing a signal quality parameter of the signal to a threshold; and in the event that the signal quality parameter is less that the threshold, using linear interpolation;

in the event that the signal quality parameter is not less that the threshold:

generating at least one parameter based on the received power of at least a portion of the signal;

comparing each parameter to a respective threshold and, on the basis of said comparison or comparisons, determining at least one of:

a type of interpolation or extrapolation to be used; and one or more parameters used in said interpolation or extrapolation.

Preferably the type of interpolation can be linear or LMMSE.

The type of interpolation or extrapolation can be determined to be LMMSE, the method includes determining one or more LMMSE matrices on the basis of a comparison of at least one parameter to its respective threshold.

The step of generating at least one parameter based on the received power of at least a portion of the signal can include: parameter determined on the basis of received power is determined for a periods greater than the effective delay spread of the signal.

The separate parameters can be determined for different delay spreads; and each parameter can be compared to a different threshold.

The signal quality parameter is preferably Signal to Noise ratio.

In a second aspect the present invention provides a method of controlling an interpolation process in a device of a wireless communications system configured to receive a signal including a plurality of signal positions able to be defined by a time position and sub-carrier frequency, the method including:

comparing a signal quality parameter of the signal to a threshold; and in the event that the signal quality parameter is less that the threshold, using linear interpolation;

in the event that the signal quality parameter is not less that the threshold:

estimating a Doppler shift affecting at least a portion of the signal;

comparing Doppler estimate to at least two thresholds and, on the basis of said comparisons, determining at least one of:
a type of interpolation or extrapolation to be used; and
one or more parameters used in said interpolation or extrapolation.

In the event that the Doppler estimate is less than a first threshold, the method can include using linear interpolation or extrapolation.

In the event that the Doppler estimate is not less than the first threshold the method can include using LMMSE interpolation or extrapolation.

In the event that the Doppler estimate is less than a second threshold the method can include performing LMMSE using a corresponding set of parameters.

In the event that the Doppler estimate is less than a third threshold the method can include performing LMMSE using second corresponding set of parameters.

In a third aspect the present invention provides a method in a device of a wireless communications system configured to receive a signal including a plurality of signal positions able to be defined by a time position and sub-carrier frequency, the method including:
receiving a signal including a first number of reference signals;
generating a second number of tentative channel estimates on the basis of the first number of reference signals, wherein the second number of channel estimates are greater than the first number of reference signals received.

The method can include: generating channel estimates for the received reference signals and estimating tentative channel estimates for one or more signal positions between said received reference signals by interpolating between two or more neighbouring reference signals.

The interpolation is preferably selected from either linear or LMMSE interpolation.

The interpolation can be performed between pairs of neighbouring reference signals in either a time or frequency dimension.

One or more of the number of tentative channel estimates, and the type of interpolation to use for generating is preferably determined on the basis of a signal parameter or condition.

Preferably the interpolated value in respect a signal position is based on channel estimates for a plurality of signal positions either side of the said signal position.

The interpolated value in respect a signal position can be based on weighted values of channel estimates for a plurality of signal positions either side of the said signal position.

In one form the type of interpolation and/or parameters used in the interpolation are determined using a method according to either of the first or second aspects of the invention.

In a fourth aspect the present invention provides a method in a device of a wireless communications system configured to receive a signal including a plurality of signal positions able to be defined by a time position and sub-carrier frequency, the method including:
creating a first vector corresponding to channel estimates for a plurality of signal positions;
creating a second vector of channel estimates for an increased plurality of signal positions by:
determining a value of X additional signal positions following on from the first vector by extrapolation on the basis of a plurality of channel estimates from one end of the first vector;
determining a value of Y additional signal positions spaced apart from the X additional signal positions on the basis of a plurality of channel estimates from the other end of the first vector.

The method can further include: interpolating between the X and Y additional signal positions to populate at least some of the signal positions in the vector between them.

The extrapolation is preferably selected from either linear or LMMSE extrapolation.

The signal positions between the X and Y additional signal positions not populated by interpolation can be filled with zeros.

The parameters of any one of the extrapolation or interpolation can be determined on the basis of a signal parameter or condition.

The second vector preferably has a length equal to the next power of two higher than the length of the first vector.

In a fifth aspect the present invention provides a method in a device of a wireless communications system configured to receive a signal including a plurality of signal positions able to be defined by a time position and sub-carrier frequency, the method including:
receiving a time domain signal including $2^n$ time domain samples representative of channel estimates of a plurality of signal positions in the signal;
de-noising the time domain signal using one or more of the following methods:
replacing all samples below a threshold value with a predetermined value;
applying one or more windows to the signal, and replacing all samples outside the window with a predetermined value;
applying one or more windows to the signal and processing the samples outside the windows in accordance with a second de-noising algorithm.

The parameters of the one or more windows can be determined on the basis of either: a delay spread of the signal; or a position of one or more peaks detected in the time domain signal.

The position of a peak in the time domain signal is preferably detected by: up-sampling the time domain signal; and applying a filter to enhance a suspected peak. The predetermined value is preferably zero.

The threshold can be set adaptively.

The de-noising method can be selected and or the parameters of the de-noising method selected on the basis of a signal parameter or condition.

In a sixth aspect the present invention provides a method in a device of a wireless communications system configured to receive a signal including a plurality of signal positions able to be defined by a time position and sub-carrier frequency, the method including:
receiving a signal representing CE data in respect a discontinuous plurality of signal positions;
interpolating between CE data, to obtain CE data for signal positions in respect of at least one additional frequency sub-carrier.

The interpolation is preferably selected from linear or LMMSE.

The type of Interpolation and/or parameters used in the interpolation are determined using a method according to the first aspect of the invention.

The post processing can further include, extrapolating on the basis of the CE of at least two known signal positions to determine a CE for a signal position at the edge of a band.

Type of extrapolation and/or parameters used in the extrapolation are determined using a method according to the first aspect of the present invention.

At least one parameter of the method selected can be determined on the basis of a signal parameter or condition.

In a seventh aspect the present invention provides a method in a device of a wireless communications system configured to receive a signal including a plurality of signal positions able to be defined by a time position and sub-carrier frequency, the method including: obtaining CE for all sub-carriers in a first time position; obtaining CE for all sub-carriers in a second time position; and extrapolating between the obtained CE values for a frequency sub-carrier to obtain CE values for intermediate signal positions.

The interpolation is preferably linear or LMMSE interpolation.

The method can further include selecting between either linear or LMMSE interpolation on the basis of at least one signal parameter or condition.

The type of interpolation and/or parameters used in the interpolation are preferably determined using a method according to the second aspect of the present invention.

The signal parameter or condition up on which the methods can be controlled can include: signal delay spread; signal Doppler frequency; signal to noise ratio; CP length.

In a eighth aspect the present invention provides a method of channel estimation for use in a system configured to receive a signal including a plurality of signal positions able to be defined by a time position and sub-carrier frequency, the method including:

generating an initial set of a first number of tentative channel estimates in respect of a plurality of signal positions;

generating a vector of channel estimates including Nls channel estimates, where Nls is the greater than the first number of tentative channel estimates;

converting the vector into a time domain signal;

de-noising the time domain signal;

processing the de-noised signal to generate a frequency domain signals representing a plurality of CE values not equal to the first number of tentative channel estimates;

interpolating between at least some of the CE values to determine CE values for a plurality of signal positions.

The step of generating an initial set of a first number of tentative channel estimates is preferably performed using an embodiment of the third aspect of the present invention.

The step of generating a vector of channel estimates is performed preferably performed using an embodiment of the fourth aspect of the present invention.

The step of de-noising the time domain signal is performed preferably performed using an embodiment of the fifth aspect of the present invention.

The step of processing the de-noised signal to generate a frequency domain signal is performed preferably performed using an embodiment of the sixth aspect of the present invention.

The step of interpolating between at least some of the CE values is performed preferably performed using an embodiment of the seventh aspect of the present invention.

Preferably the signal is an OFDM signal.

In a ninth aspect the present invention provides a system for use in a mobile terminal of a telecommunications network including at least one processing block configured to perform a method of an embodiment of any one of the aspects of the present invention.

Preferably the system includes a plurality of processing blocks configured to perform a plurality of methods according an embodiments of respective aspects of the present invention.

The system can further including a control means configured to control at least one of said processing blocks on the basis of a signal parameter or transmission condition.

The control means is to control at least one of said processing blocks on the basis of one or more of the following: signal delay spread; signal Doppler frequency; signal to noise ratio; CP length.

The control means can be adapted to control the one or more processing blocks in accordance with table 1.

Preferably the received signal is an OFDM signal.

BRIEF DESCRIPTION OF THE DRAWINGS

Illustrative embodiments of the present invention will now be described, by way of non-limiting example only, with reference to the accompanying drawings, in which.

DETAILED DESCRIPTION OF THE EMBODIMENTS

Figure 3:
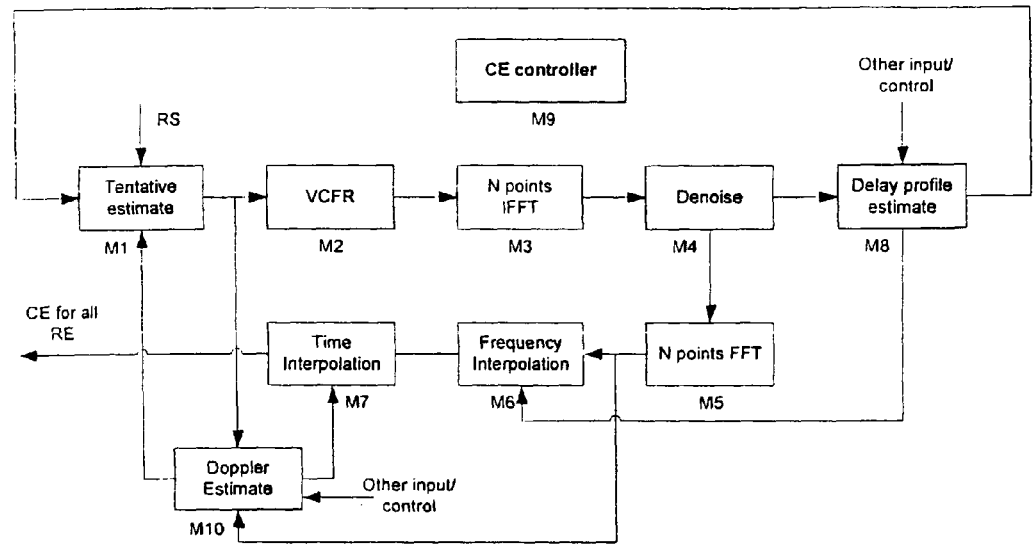
FIG. 3 is a schematic block diagram illustrating a system for channel estimation system in a device operating in a wireless communication system, operating in accordance with an embodiment of the present invention.

FIG. 3 is a schematic block diagram illustrating a system for channel estimation system in a device operating in a wireless communication system, operating in accordance with an embodiment of the present invention.

Figure 2:
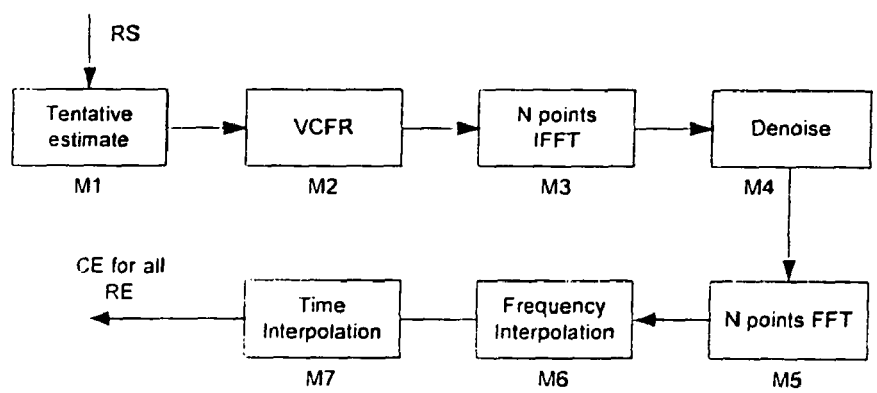
FIG. 2 is a schematic block diagram illustrating a conventional channel estimation system in a device operating in a wireless communication system.

One difference between the system of FIG. 3 and that of FIG. 2 is the use of block M9 which performs a function of controlling the operation of blocks M1,M2,M4,M5, . . . , M8 to optimize CE performance in different channel conditions. Other differences will also become apparent on reading the following description.

Figure 1:
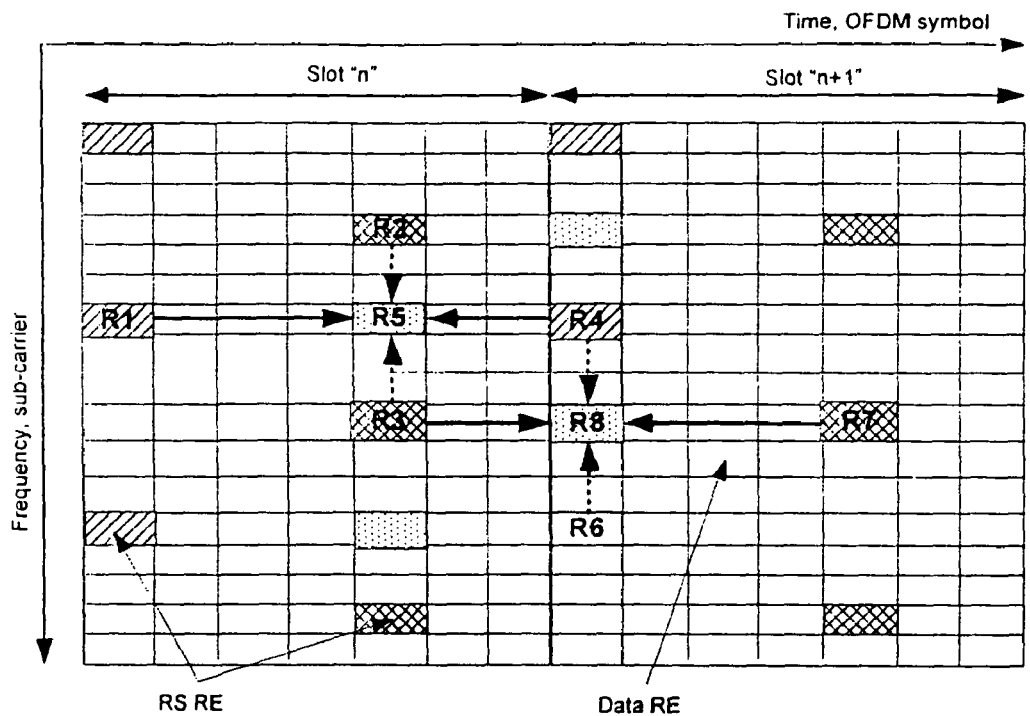
FIG. 1 shows a Time-Frequency (TF) grid illustrating the arrangement of RS RE over a two slots in an OFDM system.

The function of each of the blocks of the system will now be explained by with reference to an exemplary situation. Consider 10 MHz OFDM system with normal CP. In the context of FIG. 1, there will be 600 sub-carriers in frequency direction and there will be Nrs=100 RS RE in one OFDM symbol.

Block M1—Generates a vector of Nls=Nrs=100 or Nls=2Nrs=200 tentative estimates, depending on the parameters set by Block M9.

If Nls=100,100 tentative estimates are generated as in the conventional approach.

If Nls=200, FIG. 1 illustrates how the additional 100 tentative estimates (in addition to above 100) are generated. In this figure the RE shaded with dots are the additional "tentative estimates" and are generated by interpolation in either the time direction, e.g. R5=$f_t$(R1 and R4) and R8=$f_t$(R3 and R7), or in the frequency direction, e.g. R5=$f_f$(R2 and R3); R8=$f_f$ (R4 and R6) in certain embodiments of the present invention. Functions $f_t$ and $f_f$ can be simple linear or LMMSE interpolation.

This block can operate as follows under control of Block M9:

Nls=100 should be used when:
   No RS in previous/next OFDM symbol are available; or
   The channel has High Doppler and large delay spread.
Nls=200 should be used otherwise.
$f_t$ should be used in low Doppler, and $f_f$ should be used in high Doppler and small delay spread
In case of low Doppler and low SNR, RS from more than one previous OFDM can be used (e.g. using a weighted average) to obtain tentative estimate for current OFDM symbol to improve CE performance.

In an alternative embodiments M1 can operate using LMMSE or linear interpolation in a manner directed by the output of either blocks M8 or M10.

Figure 4:
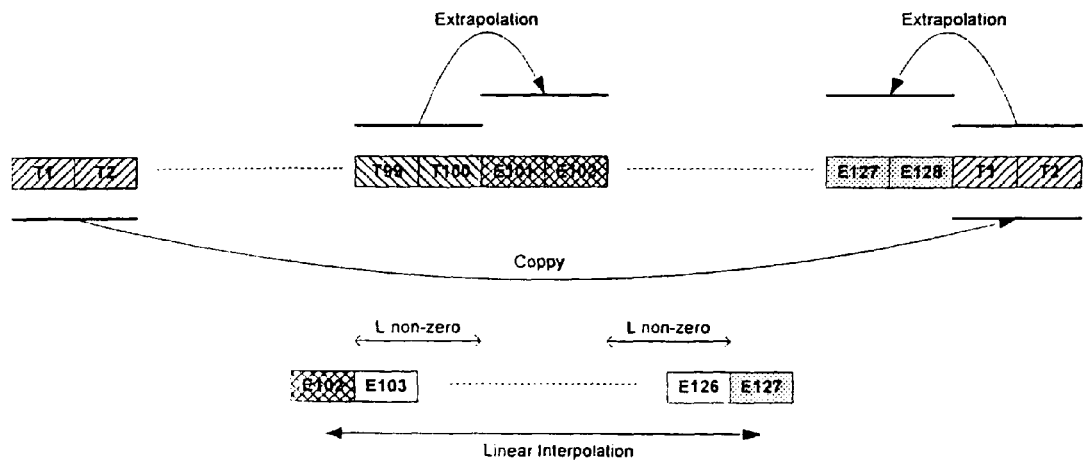
FIG. 4 illustrates a method of interpolation performed while determining VCFR in an embodiment of the present invention.

Block M2 This block generates a vector of N=128 or 256 depending on whether Nls=100 or 200 respectively. FIG. 4 illustrates an example of how this is performed for N=128.

T1, T2, ..., T100 are input samples, i.e. tentative estimates,
E101 and E102 are extrapolated samples using T99 and T100
E127 and E128 are extrapolated samples using T1 and T2
Extrapolation to get E101, E102, E127 and E128 can be linear or LMMSE.
E103 to E126 are generated by linear interpolation between E102 and E127. Among those, only 2L samples are kept, the remaining are set to zero. L is a parameter set by control block M9.

This block can operate as follows under control of Block M9:

Linear Extrapolation should be used in low delay spread;
LMMSE Extrapolation should be used in high delay spread;
L should be set to 0 in low SNR.

Figure 5:
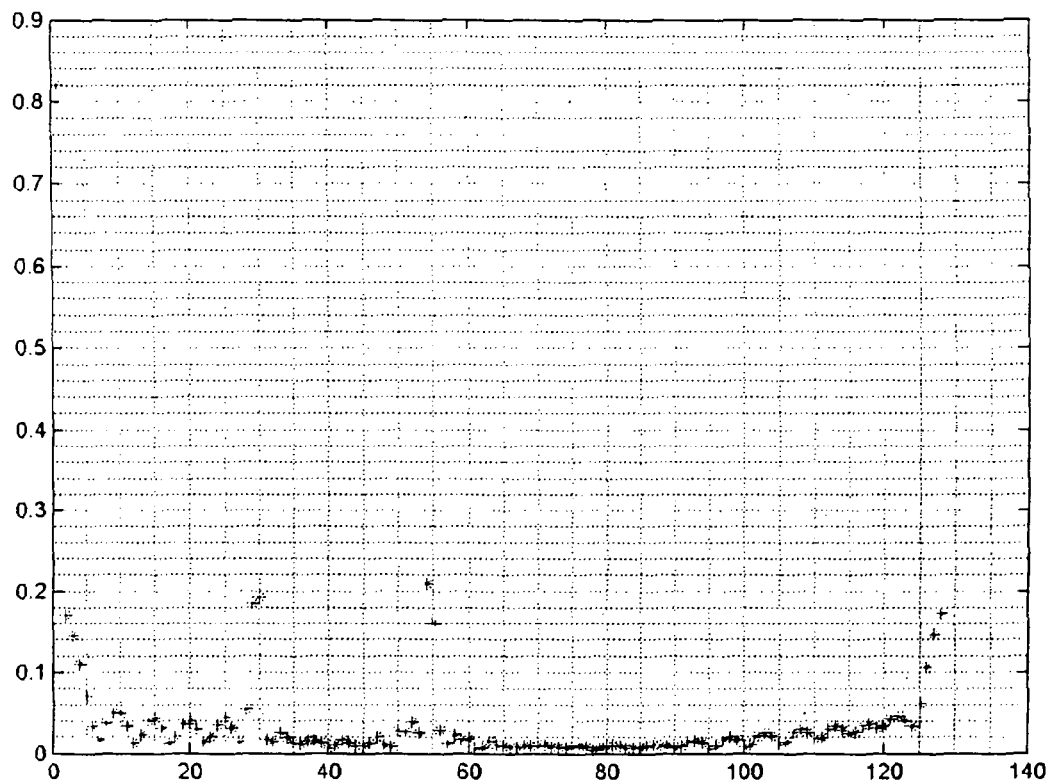
FIG. 5 illustrates an exemplary VCIR of a channel in an embodiment of the present invention.

Block M4 M4 performs de-noising of the VCIR. An exemplary VCIR is shown in FIG. 5. In this figure, N=128 (time domain), and there are 3 paths at positions 1, 30 and 54 where 2nd and 3rd paths are 10 dB below the 1st path.

Block M4 can be configured to perform three types of de-noising, preferably it is adapted to selectively perform one or more of the following combinations of de-noising on the basis of control input from block M9.

Type 1: The first type of de-noising able to be implemented in M4 is to set all samples in the VCIR to a chosen level, e.g. zero, which have magnitude below a threshold T. T can be chosen so that the three peaks and few surrounding samples are kept. In the present example T should be about 0.03, although other thresholds can be selected. Preferably the threshold T is able to be set dynamically on the basis of the SNR.

Type 2: The second type of de-noising able to be implemented in M4 is to zeros all samples in VCIR which are outside a window (W), regardless of their magnitude. In above figure, windows could be made cover samples from 1 to 60 and from 120 to 128. The length of the window can be selected based on the CP length of the OFDM signal. The samples within the window can be subject to further processing, e.g using the type 1 de-noising above.

Type 3: The third type of de-noising able to be implemented in M4 is to mask certain regions of the VCIR so that the samples within the mask windows are retained, irrespective of the level of these samples, when de-noising according to the Type 1 process is performed outside the masked window.

The mask window is normally a small window centred at position of a detectable path. To detect the position of a path, especially a non-sample space path, the Y=ABS(VCIR) is up sampled by inserting 2 or 5 zeros between two consecutive samples, and then filtering by sinc filter or simple FIR filter. This can enhance the peak at position correspond to a path (particularly a non-sample space path) and thus its position can be detected more easily.

Samples in VCIR not correspond to paths can be used to estimate wideband noise variance.

In a preferred form the system is adapted to perform the following combinations of the above mentioned de-noising algorithms:

Type 1 only;
Type 2 and Type 1;
Type 3 and Type 1; or
Type 2 and Type 3 and Type 1.

This block can operate as follows under control of Block M9:

The de-noising type 1, 2 or 3 can be used in different combinations:
T should be small/large for high/low SNR respectively;
A window (W) should be small/large for small/large delay spread respectively;
N should be large to better cancel inter sector interference.

Block M8

Block M8 performs the selection of an LMMSE matrix to be used in the frequency interpolation/extrapolation performed in M6. In a special case it can also select that linear interpolation should be used.

M8 receives as its input the power of the VCIR samples after being de-noised by block M4. It also receives the following data:

SNR estimate: SNR estimate for current period of T radio frames
T: averaging period for delay profile calculation
K: number of instances for averaging
SNR threshold: to decide if delay estimation is needed
M: Timing error margin
L: Delay spread coverage—effectively cover CP length and 2M.
P: Power threshold to identify position of the first path
Q: Power threshold for zeroing low level samples. Q≧P.
P0,P1,P2,P3: Threshold for LMMSE matrices selection
LMSE1, LMSE2, LMSE3, LMSE4—LMMSE matrices
W0, W1, W2, W3, W4: windows for LMMSE matrix selection.

As noted above, the output of M8 is a selection of an LMMSE matrix (with linear interpolation as special case) to block M6 every T radio frames. Block M6 uses the matrix in the next period of T radio frames to perform interpolation/extrapolation in the frequency direction.

M8 selects whether linear interpolation/extrapolation to use or which LMMSE matrix to use, e.g. LMSE1, LMSE2, LMSE3, LMSE4 using the following method:

Step 1

If SNR estimate<SNR threshold then linear interpolation will be used. If not use the following steps:

Step 2

Obtain average power of de-noised VCIR over period T using K instances as follows:
Initialisation: $h_0 = \lfloor h_{k,0}, h_{k,1}, \ldots, h_{k,N-1} \rfloor$ when k=0 i.e. first instance is a period T.
Timing offset correction: In any sub-sequent instance k<K, if there is effective non zero timing offset O compared to instance k−1, which needs to be removed from $\lfloor h_{k,0}, h_{k,1}, \ldots, h_{k,N-1} \rfloor$ as:

$\lfloor h_{k,0}, h_{k,1}, \ldots, h_{k,N-1} \rfloor = \lfloor h_{k,N-O}, h_{k,N-O+1}, \ldots, h_{k,N-1}, h_{k,0}, h_{k,1}, \ldots, h_{k,N-O-1} \rfloor$, if the timing of k instance is later than that of k−1 instance; and $\lfloor h_{k,0}, h_{k,1}, \ldots, h_{k,N-1} \rfloor = \lfloor h_{k,O}, h_{k,O+1}, \ldots, h_{k,N-1}, h_{k,0}, h_{k,1}, \ldots, h_{k,O-1} \rfloor$, if the timing of k instance is earlier than that of k−1 instance.

The effective non zero timing offset O is defined as follows: Denote OO as original timing offset measured in number of samples at the FFT input in DEM module, then O is the largest integer that smaller than OO×$N_T$/N where N is the IFFT size (i.e. the size of M2 output) and $N_T$ is number of tentative estimates (i.e. the size of M2 input). Note that $N_T$<N.

Accumulation: $h_k = h_{k-1} + \lfloor h_{k,0}, h_{k,1}, \ldots, h_{k,N-1} \rfloor$.

Construct $\hat{h} \lfloor \hat{h}_0, \hat{h}_1, \ldots, \hat{h}_{L-1} \rfloor = \lfloor h_{K-1,N-M}, \ldots, h_{K-1,N-1}, h_{K-1,0}, h_{K-1,1}, \ldots, h_{K-1,L-M-1} \rfloor$ Let $\hat{h}_{max} = \max\{\hat{h}_0, \hat{h}_1, \ldots, \hat{h}_{L-1}\}$ Set the elements of $\hat{h}$ which is more than Q dB below $\hat{h}_{max}$ to zeros $$\hat{h}_n = \begin{cases} 0 & \text{if } \hat{h}_n < \hat{h}_{max} \times 10^{-P/10} \\ \hat{h}_n & \text{otherwise} \end{cases}$$

Step 3:

Denote n_first as smallest index that satisfies $\hat{h}_{n\_first} \geq \hat{h}_{max} \times 10^{-P/10}$ Divide interval [n_first, L−1] into $N_W$ windows (typically 4 or 5 windows for normal or extended CP) so that they cover the effective delay spreads of W0, W1, W2, . . . seconds.

For each window, calculate the sum of $\hat{h}_n$ inside the window to generate $\{S_0, S_1, \ldots, S_W\}$. Then select the LMMSE matrix as follows:

$$\text{If } \frac{S_0}{\sum_{k=0}^{N_W-1} S_k} > P0 \text{ - select linear interpolation}$$

$$\text{If } \frac{S_0 + S_1}{\sum_{k=0}^{N_W-1} S_k} > P1 \text{ - select } LMSE1$$

$$\text{If } \frac{S_0 + S_1 + S_2}{\sum_{k=0}^{N_W-1} S_k} > P2 \text{ - select } LMSE2$$

$$\text{If } \frac{S_0 + S_1 + S_2 + S_3}{\sum_{k=0}^{N_W-1} S_k} > P3 \text{ - select } LMSE3$$

Else - Select LMSE4

The same output can be used to select an LMMSE matrix for the tentative CE generation performed by M1

Block M5 M5 is an FFT block of size N.

Figure 6:
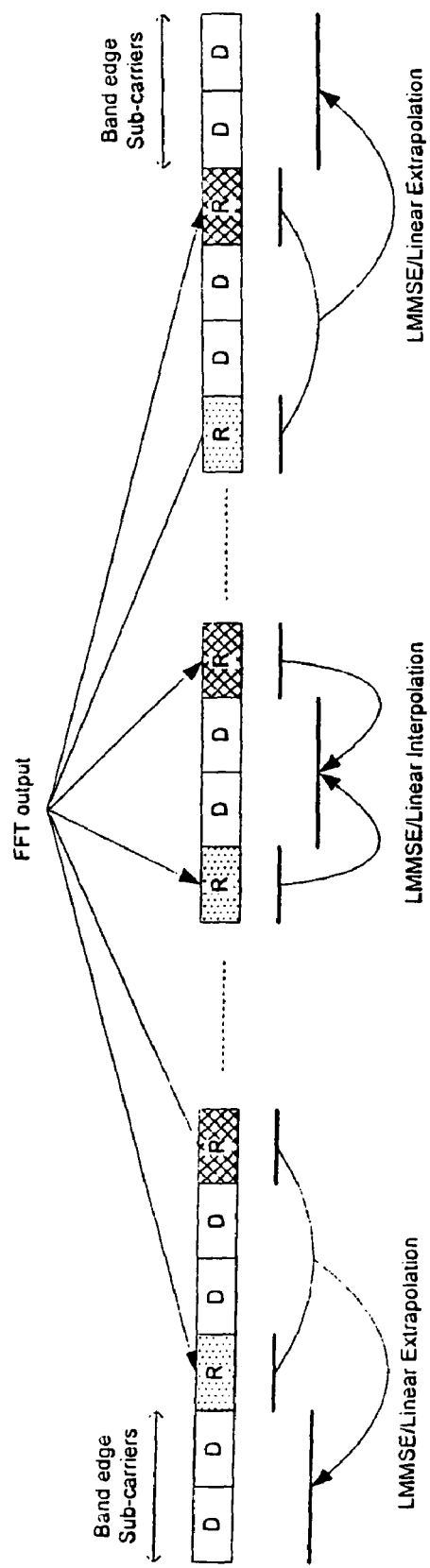
FIG. 6 illustrates a first example of frequency interpolation used in a system of the present invention.

Block M6 Block M6 performs an interpolation of the frequency domain outputs from the FFT stage to arrive at CE for each sub carrier. Whether linear or LMMSE interpolation/extrapolation is used is determined by the output of M8. In the event that LMMSE is used the matrix is determined by the output of M8. FIG. 6 illustrates diagrammatically the interpolation/extrapolation performed in M6.

Block M7 Block M7 is responsible for controlling performing CE interpolation in the time direction. Interpolation can be linear or LMMSE.

Figure 7:
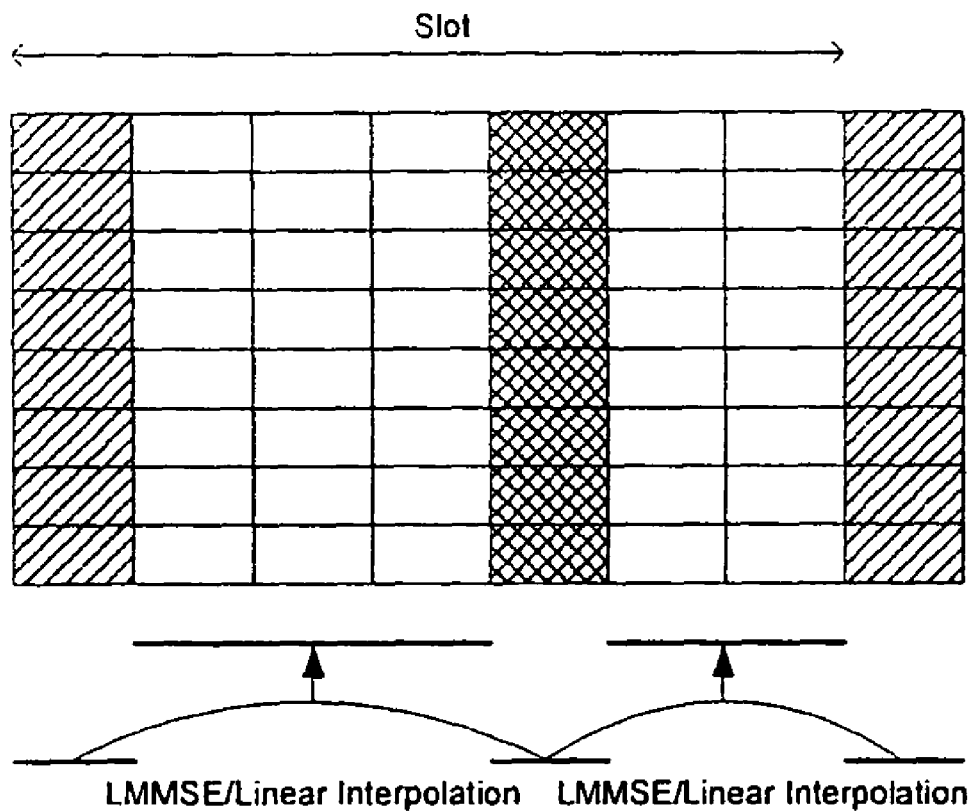
FIG. 7 illustrates an exemplary method of completing CE in the time direction in an embodiment of the present invention.

This block can operate as follows under control of Block M9:

Use LMMSE interpolation in case of high Doppler
Use Linear interpolation in case of low Doppler
FIG. 7 illustrates this scheme diagrammatically.

Block M9 This block provides overall control and coordination for other blocks to optimize CE performance for different channel condition and constraints as mentioned above (such as availability of RS in previous/next OFDM symbols). Below is a summary example of a set of control parameters where RS in previous/next OFDM symbols are assumed available.

TABLE 1

| | | Low SNR | High SNR |
|---|---|---|---|
| Low Doppler | Small delay spread | Average LS estimate over A OFDM symbols (M1)<br>Tentative spacing = 3 (M1)<br>Linear extrapolation for band edge (M2)<br>L = 0 (M2)<br>High threshold for de-noise (M4)<br>Linear interpolation (M7) | Average LS estimate over B < A OFDM symbols (M1)<br>Tentative spacing = 3 (M1)<br>Linear extrapolation for band edge (M2)<br>L = L_def (M2)<br>Low threshold for de-noise (M4)<br>Linear interpolation (M7) |
| | Large delay spread | Average LS estimate over A OFDM symbols (M1)<br>Tentative spacing = 3 (M1)<br>LMMSE extrapolation for band edge (M2)<br>L = 0 (M2)<br>High threshold for de-noise (M4)<br>LMMSE extrapolation for band edge (M6)<br>Linear interpolation (M7) | Average LS estimate over B < A OFDM symbols (M1)<br>Tentative spacing = 3 (M1)<br>LMMSE extrapolation for band edge (M2)<br>L = L_def (M2)<br>Low threshold for de-noise (M4)<br>LMMSE extrapolation for band edge (M6)<br>Linear interpolation (M7) |
| High Doppler | Small delay spread | No average (M1)<br>Tentative spacing = 3 or 6 (M1)<br>Linear extrapolation for band edge (M2)<br>L = 0 (M2)<br>High threshold for de-noise (M4)<br>LMMSE interpolation (M7) | No average (M1)<br>Tentative spacing = 3 or 6 (M1)<br>Linear extrapolation for band edge (M2)<br>L = L_def (M2)<br>Low threshold for de-noise (M4)<br>LMMSE interpolation (M7) |

TABLE 1-continued

| | Low SNR | High SNR |
|---|---|---|
| Large delay spread | No average (M1)<br>Tentative spacing = 3 or 6 (M1)<br>LMMSE extrapolation for band edge (M2)<br>L = 0 (M2)<br>High threshold for de-noise (M4)<br>LMMSE extrapolation for band edge (M6)<br>LMMSE interpolation (M7) | No average (M1)<br>Tentative spacing = 3 or 6 (M1)<br>LMMSE extrapolation for band edge (M2)<br>L = L_def (M2)<br>Low threshold for de-noise (M4)<br>LMMSE extrapolation for band edge (M6)<br>LMMSE interpolation (M7) |

Coefficients of LMMSE filters can be optimised for high Doppler or large delay spread.

Block M10

Block M10 performs selection of an LMMSE matrix for the time interpolation/extrapolation performed by the block M7.

Block M10 takes, as its inputs;

LS estimates or de-noised estimates for RS RE;

SNR estimate: SNR estimate for current period of T radio frames

T: averaging period for Doppler estimation

K: number of instances for averaging

SNR threshold: to decide if Doppler estimation is needed f0, f1, f2: Threshold for LMMSE matrix selection LMSE1, LMSE2, LMSE3—LMMSE matrices As an output it provides a selection of LMMSE matrices (with linear interpolation as special case) to M7 every T radio frames for M7 to use in the next period of T radio frames.

To select with LMMSE matrices to pass to block M7, block M10 performs the following process:

Step 1:

If SNR estimate<SNR threshold, linear interpolation will be used.

Otherwise the following steps are taken:

Step 2:

Obtain average of Doppler estimate over period T using K instances as follows:

If the Doppler estimate<f0—select linear interpolation, preferably optimized for very slow speed.

If Doppler estimate<f1—select LMSE1, which is optimized for slow to medium speed.

If Doppler estimate<f2—select LMSE2, which is optimized for high speed

Otherwise select LMSE3, which is optimized for very high speed

In an alternative embodiment the above algorithm can also be used to select the LMMSE matrices for tentative estimates generation in M1

Preferred forms of the various aspects of the present invention may confer the following advantages on the system:

The use of LMMSE interpolation in the frequency direction provides significant performance gain for CE over conventional linear interpolation method. For example, in TU6 channel at 30 dB SNR, the gain is about 5 dB and the complexity increase is manageable.

The use of simple linear/LMMSE extrapolation to obtain extra samples at the edge of VCFR enables receiver to achieve the peak throughput in high SNR condition. The complexity increase is negligible.

The use of simple linear interpolation in generating VCFR instead of complicated existing one provides comparable or even better performance.

By considering DC sub-carrier in actual RS spacing, slight improvement in CE can be achieved.

The use of simple LMMSE extrapolation to improve CE for band edge sub-carriers in large delay spread channel condition.

The use of simple LMMSE interpolation to improve CE for sub-carriers in OFDM symbols not carrying RS in high Doppler channel condition.

The use of sinc/FIR interpolation to improve the magnitude of non-sample space path can reduce the possibility that the path being removed during de-noising.

The use of CP windowing in VCIR improve CE performance.

The use of an adaptive de-noise threshold optimise CE performance in different conditions.

The use of VCIR for wide band noise variance estimation can improve the accuracy of the estimate.

The use of de-noise CE for Doppler estimation improve accuracy of the estimate.

The use of reduced RS spacing and FFT interpolation at high Doppler (and large delay spread) can improve CE performance.

The use of controller to control the use of different methods to optimize CE performance in various channel condition.

In case of low Doppler, no FH and low SNR, RS from current and more than one previous OFDM can be used (weighted average) to obtain tentative estimate for current OFDM symbol to improve CE performance.

In case of low Doppler, FH and low SNR, VCIR (before de-noise) from current and more than one previous OFDM can be used (weighted average) to obtain VCIR for current OFDM symbol to improve CE performance.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of controlling an interpolation process in a device of a wireless communications system configured to receive a signal including a plurality of signal positions able to be defined by a time position and sub-carrier frequency, the method including:

comparing a signal quality parameter of the signal to a threshold; and in the event that the signal quality parameter is less than the threshold, using linear interpolation;

in the event that the signal quality parameter is not less than the threshold:

generating at least one parameter based on the received power of at least a portion of the signal;

comparing each parameter to a respective threshold and, on the basis of said comparison or comparisons, determining at least one of:

a type of interpolation or extrapolation to be used; and one or more parameters used in said interpolation or extrapolation.

2. A method as claimed in claim 1 wherein the type of interpolation can be linear or linear minimum mean square error (LMMSE).

3. A method as claimed in claim 1, wherein, when the type of interpolation or extrapolation is determined to be linear minimum mean square error (LMMSE), the method includes determining one or more LMMSE matrices on the basis of a comparison of at least one parameter to its respective threshold.

4. A method as claimed in claim 1, wherein the generating at least one parameter based on the received power of at least a portion of the signal includes:
   parameter determined on the basis of received power is determined for a period greater than the effective delay spread of the signal.

5. A method as claimed in claim 4, wherein separate parameters are determined for different delay spreads; and
   wherein each parameter is compared to a different threshold.

6. A method as claimed in claim 1, wherein the signal quality parameter comprises a Signal to Noise ratio.

7. A method of controlling an interpolation process in a device of a wireless communications system configured to receive a signal including a plurality of signal positions able to be defined by a time position and sub-carrier frequency, the method including:
   comparing a signal quality parameter of the signal to a threshold; and
   in the event that the signal quality parameter is less than the threshold, using linear interpolation;
   in the event that the signal quality parameter is not less than the threshold:
      estimating a Doppler shift affecting at least a portion of the signal;
      comparing Doppler estimate to at least two thresholds and, on the basis of said comparisons, determining at least one of:
         a type of interpolation or extrapolation to be used; and
         one or more parameters used in said interpolation or extrapolation.

8. A method as claimed in claim 7 wherein, in the event that the Doppler estimate is less than a first threshold, using linear interpolation or extrapolation.

9. A method as claimed in claim 8, wherein, in the event that the Doppler estimate is not less than the first threshold, using linear minimum mean square error (LMMSE) interpolation or extrapolation.

10. A method as claimed in claim 9 wherein in the event that the Doppler estimate is less than a second threshold performing LMMSE, using a corresponding set of parameters.

11. A method as claimed in claim 10 wherein in the event that the Doppler estimate is less than a third threshold performing LMMSE, using a second corresponding set of parameters.

* * * * *